United States Patent [19]

Whitecotton et al.

[11] 4,226,143
[45] Oct. 7, 1980

[54] METHOD OF MAKING STEEL RULE TYPE PIERCING AND BLANKING DIES

[76] Inventors: Graydon D. Whitecotton, 791 Shaddow Brook Dr.; Walley E. Whitecotton, 1316 Branch La., both of Columbia, S.C. 29210

[21] Appl. No.: 37,511

[22] Filed: May 14, 1979

[51] Int. Cl.³ ............................................. B21K 5/12
[52] U.S. Cl. ................................ 76/107 C; 409/110; 51/165.74; 116/307; 118/35
[58] Field of Search .................... 76/107 C, 107 R; 51/286, 310–312, 165.74, 165.75, 165.76; 118/35, 75; 409/110; 116/307

[56] References Cited

U.S. PATENT DOCUMENTS 3,152,492   10/1964   Whitecotton .................. 76/107 C Primary Examiner—Nicholas P. Godici
Assistant Examiner—Roscoe V. Parker, Jr.
Attorney, Agent, or Firm—Jenkins, Coffey, Hyland, Badger & Conard

[57] ABSTRACT

A steel rule first die is made by mounting steel rule elements, and other shearing elements if desired, in a die block in known manner. A punch die blank is mounted on a support having means for aligning the blank with such shearing elements. One or more layers of adhesive tape of predetermined thickness are applied to the shearing side face of the shearing elements to define a clearance-producing layer thereon. Foamed plastic blocks are adhered to the punch blank so as to form defined areas on its face opposite the shearing elements of the first die, and an adherent impressionable soft layer of hardenable resin is applied to such defined areas. The first die is then assembled in aligned relation with the punch die blank, with its shearing elements impressed deeply in the soft resin layer so as to form wide edge faces in such layer against the clearance-producing layer of tape on the shearing side faces of the shearing elements. The resin layer is hardened and the punch blank is then removed from the assembly with the die element impression fixed thereon. The edge faces are desirably coated with a contrasting color which may penetrate the hardened resin. The punch blank is then machined to the hardened impression, and the machining step is controlled in accordance with removal of color from the edge faces which define the die element impression. This forms a punch which accurately matches the shearing elements of the first die, with clearance therefrom corresponding to the thickness of the tape. The tape and resin are removed, and the steel rule die and the punch are mounted in a die set for use.

9 Claims, 10 Drawing Figures

U.S. Patent  Oct. 7, 1980  Sheet 1 of 2  4,226,143
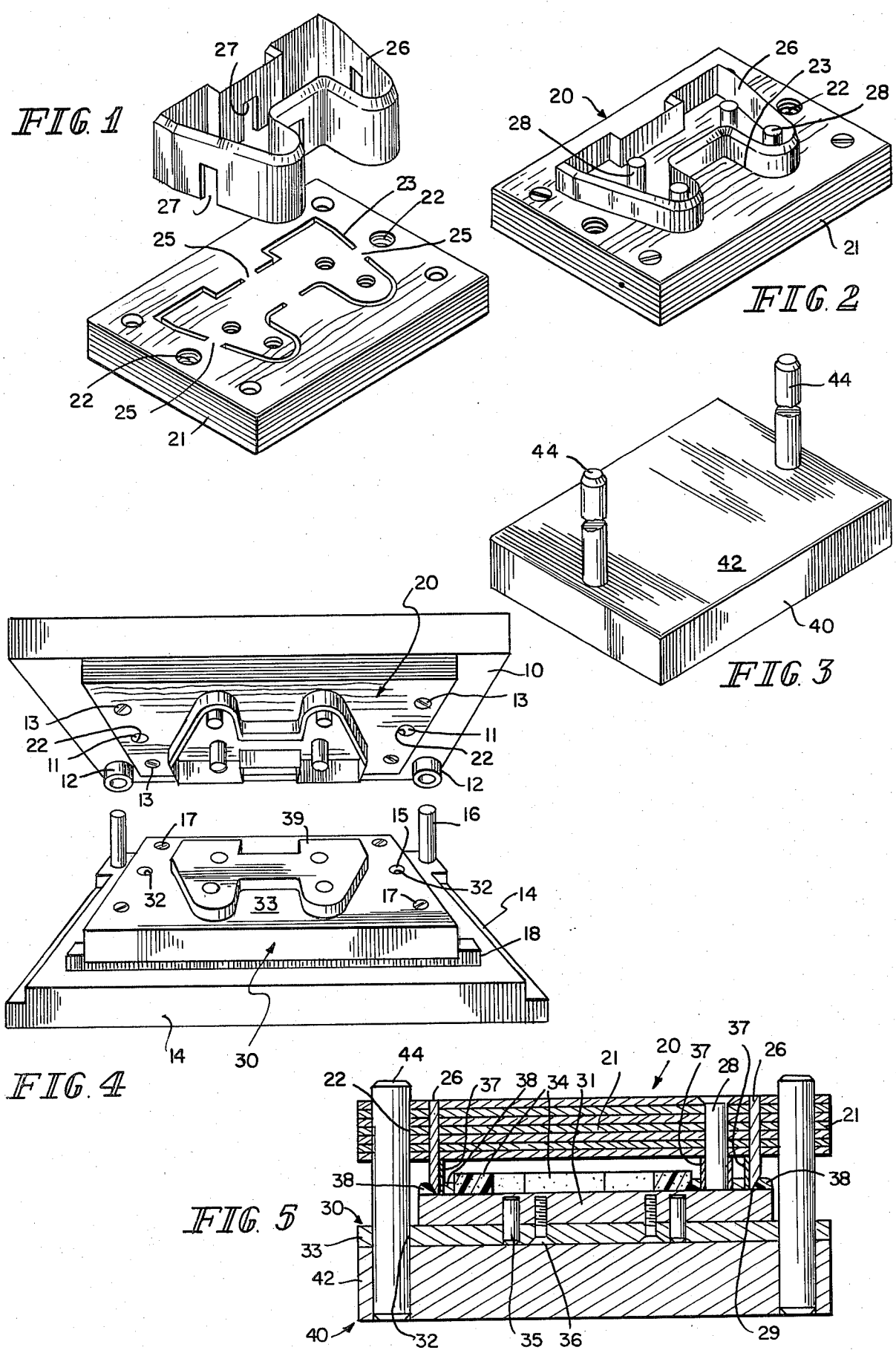

METHOD OF MAKING STEEL RULE TYPE PIERCING AND BLANKING DIES

This invention relates to a method and apparatus for making steel-rule type piercing and blanking dies, and more particularly to an improvement of the method and apparatus shown in U.S. Pat. No. 3,152,492, granted Oct. 13, 1964 to Graydon E. Whitecotton.

The method of that patent is generally as follows: A steel rule first die is prepared on a die block provided with dowel holes to locate the die in a conventional master die set. A punch blank is mounted on a punch plate which has corresponding locating means, and the punch is overlaid with an adherent impressionable layer of hardenable resin, such as epoxy paste. The die and punch assembly are then assembled in accurate aligned relation in the same relative positions they will have in the die set, with the shearing elements of the die impressed in the soft layer of resin on the punch blank. The resin is then hardened to capture in the resin layer on the punch blank an exact and precise impression of the shearing elements of the die. The punch blank is then removed and sawed and filed to form a punch according to the impression in the resin. This latter operation normally includes cutting the blank to form a clearance suitable for the character and thickness of the material to be pierced or blanked by the dies in use, which means that the machining must be carried past the resin faces which define the impression of the shearing elements of the die. In order to check the resulting clearance, a second layer of hardenable plastic is applied to the punch and overlying its edges, and the die and punch are then reassembled in aligned relation and with the face of the punch telescoped past the working edges of the shearing elements. The second layer of resin is then hardened to form at the edges of the punch a thickness of hardened resin corresponding to the clearance. The parts are then separated and the clearance thickness is directly measured. If clearance correction is necessary, these clearance checking steps must be repeated, and may need to be repeated several times.

The method of said patent is advantageous for making a wide variety of piercing and blanking dies, especially for use in piercing and blanking large sheet metal panels such as side and door panels for home refrigerators and other cabinets which require piercing and blanking operations at certain areas but which include large areas where no such operations are required.

The present invention provides improvements of the method of said patent in a number of respects. It greatly improves the means of obtaining the necessary clearance between the steel rule shearing elements and the shearing edges of the cooperating punch. It eliminates the guesswork of machining the punch past the resin layer edges which define the impression of the steel rule shearing elements, and eliminates the extra step or steps required for checking the clearance produced in the prior method. This not only saves time, but produces the necessary clearance with greater accuracy. A second feature of the present invention facilitates the machining operation and increase the accuracy with which the punch blank is machined to the impression-defining edges of the hardened resin. Further in accordance with the present invention, both time and material is conserved in forming the impressionable soft layer of hardenable resin, and the resin is caused to more accurately fill the form of the shearing die.

In accordance with the invention, these improvements are obtained as follows. Before applying the soft layer of hardenable resin to the punch blank, barrier elements are adhered to the face of the punch blank so as to form defined areas thereon opposite the shearing elements of the first die, and the soft layer of hardenable resin is then applied only to those defined areas, and other areas of the punch blank at which no piercing or blanking operations are to occur are left uncoated. The barrier elements not only save the time and material which would otherwise have been required in coating the entire face of the punch blank, but the barrier elements positioned close to the shearing elements form dams to hold the soft resin in place and cause it to more completely fill the space defined by the shearing elements and force such resin into pockets or narrow spaces which tend not to be completely filled in the prior method.

Further in accordance with the invention, before the shearing elements of the first die are impressed in the soft layer of hardenable resin, their shearing side faces are covered with one or more layers of tape of predetermined thickness so as to produce on those edges a clearance-producing layer of desired thickness. When the steel rule first die is then used to make an impression in the impressionable soft layer of hardenable resin on the punch blank, such tape layer produces in that impression a clearance in accordance with the thickness of the layer of tape which was applied, so that when the punch is subsequently machined to the edge faces of that impression, the machining produces the desired clearance.

Still further, after the hardened impression has been formed and the die punch removed from the assembly, but before the machining operation, the wide edge faces of such hardened impression are coated with a coloring solution or die which produces thereon a surface coating or coloring of a color which contrasts with the underlying color of resin, and which may to some extent penetrate the surface layers of such resin. The machining step is then performed, and is controlled by observing the removal of color from the wide resin edges which define the impression of the shearing elements of the first die. For example, it has been found convenient to use a red coloring solution such as that commonly used in tool and die work to produce a color coating on a metal surface for layout purposes. In machining the punch blank having a thus-colored impression on it, the final filing step is stopped when the filing begins to remove the red coloring and the color of the impression-defining edge turns from red to pink.

The accompanying drawings illustrate the invention and show a preferred embodiment exemplifying the best mode presently contemplated by the inventor of carrying out this invention and showing other objects and features of the invention. In such drawings:

FIG. 1 is an isometric exploded view showing a steel rule shaped to the outline of a stamping to be produced, and a die block slotted to receive the steel rule to form a die;

FIG. 2 is an isometric view of a conventional die formed from the parts shown in FIG. 1;

Figure 6:
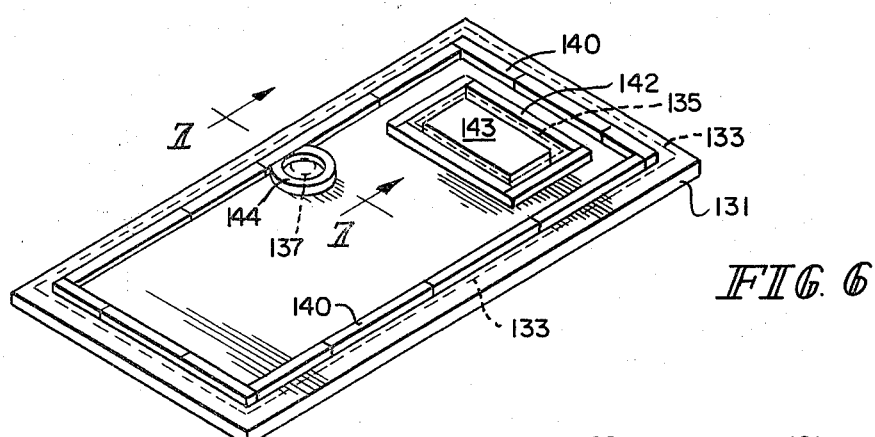
Figure 7:
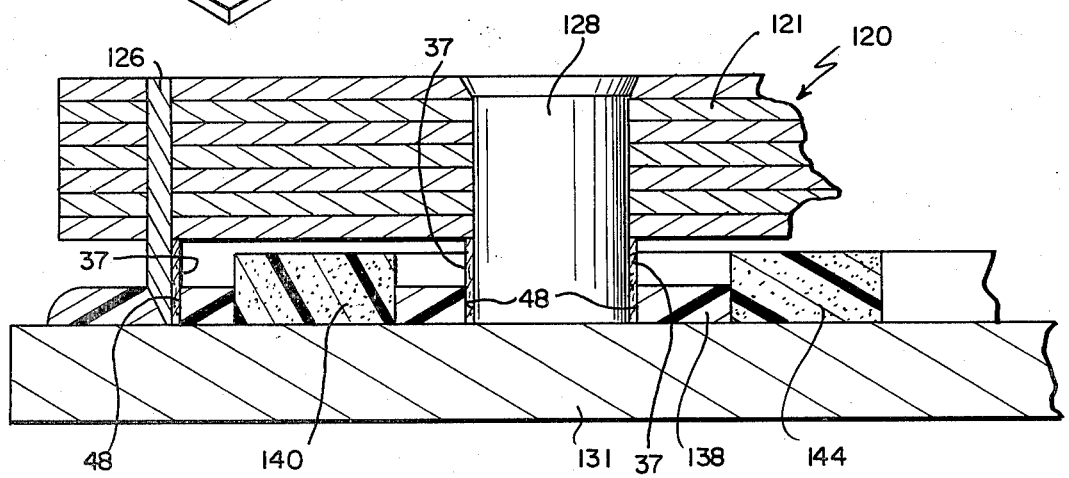
Figure 8:
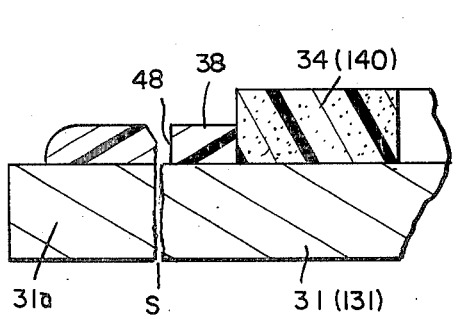
Figure 9:
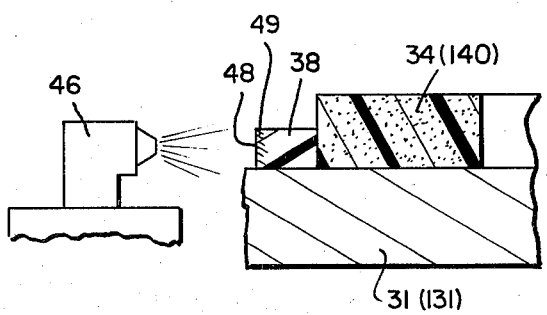
Figure 10:
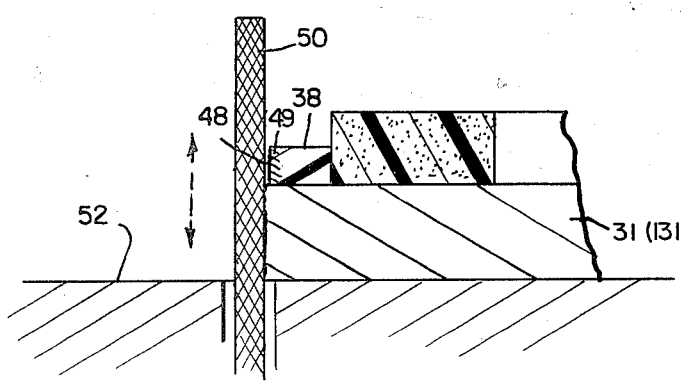

FIG. 3 is an isometric view of an assembly jig used in carrying out the method of U.S. Pat. No. 3,152,492;

FIG. 4 is a front perspective exploded view of a master die set having dies therein produced in accordance with the present invention;

FIG. 5 is a longitudinal sectional view of an assembly in accordance with the present invention, showing a punch blank assembly mounted on the jig of FIG. 3, with the die of FIG. 2 assembled thereto with its shearing elements impressed in the layer of resin on the punch blank;

FIG. 6 is a perspective view of a punch blank for blanking a large door panel, with barrier elements mounted adjacent the lines to which the blank is to be machined to form a punch;

FIG. 7 is an enlarged cross-sectional view taken on the line 7—7 of FIG. 6 and showing the relationship of the parts in forming a hardened resin impression on the punch blank for guiding and controlling the punch blank machining operation;

FIG. 8 is a diagrammatic view exemplifying the step of sawing the punch blank to an approximate configuration of the impression-forming resin layer thereon;

FIG. 9 is a diagrammatic view exemplifying the step of applying a coloring solution or coating to the edge faces of such resin layer which define the impression; and FIG. 10 is a diagrammatic view exemplifying the final machining step, in which the die blank is machined as by filing to the colored edge surface of the impression-defining edge face of the resin layer.

The master die set shown in FIG. 4 comprises a top shoe 10 having guide sleeves 12 at its rear corners, and a bottom shoe 14 having guide posts 16 at its rear corners for the reception of the guide sleeves 12, so that the upper shoe 10 will be guided for accurate translatory movement perpendicular to the lower shoe 14.

A steel rule die 20 is mounted on the upper shoe 10 and located thereon by means of locating dowels 11 fixed in the shoe and received in dowel holes 22 and is retained by screws 13 threaded into the shoe. A punch die 30 having a punch 39 is mounted on lug rails 18 on the lower shoe 14 and located on the shoe by means of dowels 15 fixed in the lower shoe 14, and is held by retaining screws 17 threaded into the shoe 14. The positions of the dowels and screws will normally be in a conventional pattern. The dowels 11 and 15 of the two shoes will be in accurate vertical alignment and the dowel holes 22 and 32 in the two dies 20 and 30 will be in coaxial alignment so as to serve as reference holes for aligning the two dies.

In the method of the invention, the construction of accurately interrelated dies 20 and 30 may be carried out with the use of a standard die set 10–14 as the guiding means for aligning the dies during manufacture. Alternatively, the dies may be aligned during manufacture with a simple jig as disclosed in U.S. Pat. No. 3,152,492 and as hereinafter described, and in such case, the use of the die set itself is not required.

The steel rule upper die 20 is made first, and this may be done by various known techniques. The die 20 shown in FIGS. 1 and 2 comprises a die block 21 of plywood material, ¾ inch thick, preferably a high-density material made especially for this purpose. For heavier dies, 1 inch thick material may be used. The exact outline of the desired stamping is laid out on the surface of the die block 21, and a slot 23 is then precision jigsawed in the block along the layout lines, with the lines defining one edge of the slot, in this case the inner edge. The width of the slot is made to receive the steel rule with a light press fit. The slot is preferably interrupted to leave bridges 25 integrally connecting the center portion to the outer or marginal portion of the die block, but may be continuous if desired. The block is also precision bored for the reception of piercing punches 28 shown in FIG. 2, and is precision bored to provide dowel holes 22 and screw holes in proper relation to the slot 23 and to match the dowel 11 and screw 13 location of the upper shoe of the master die set or holder on which the die 20 is to be used.

A steel rule die blade 26 is then formed from steel rule of a thickness to have a light press fit in the slot 23. Conveniently, the rule may be either 8-point or 10-point rule—0.112 or 0.140 inch thick—and may be either 1¼ or 1⅜ inches wide. It is notched at the bottom with notches 27 to straddle the bridges 25 of the die block 21. The shaped rule 26 is then hardened, and the hardened die rule is then inserted in the slot 23. The resulting die is then checked for accuracy and, if errors are found, is ground or adjusted to the proper dimensions and tolerances. The steel rule used may be of the standard cross-section, shown in FIGS. 1 and 2, with a 45° bevel on its working edge. The formed die blade 26 is normally ground to remove the sharp edge and to provide a narrow flat land 29 as shown in FIG. 5. The width of such land 29 will vary with the character and thickness of the material to be blanked, and should be wide enough to exert the necessary shearing pressure, but narrow enough to at least slightly impress itself into such material in order to interlock therewith to avoid lateral bending stress. The piercing punches 28 are also inserted in the block 21, and the accuracy of their positions checked. The stamping which will be produced will have the same dimensions as the die 20, and this must be properly constructed with an accuracy suited to the tolerances required in the finished stamping.

The companion die 30 is next made, and for this purpose the already completed die 20 is used in accordance with the method of the invention. A male die- or punch-blank 31 is mounted on a plate 33 by means of dowels 35 and screws 36, and the blank 31 is positioned relative to locating dowel holes 32 in the plate so that it will underlie the die 20 when the two dies are assembled with the dowel holes 22 and 32 in alignment, as shown in FIG. 5. To further prepare the punch die for such assembly, barrier blocks 34 such as blocks of foamed plastic available on the market as "Styrofoam" are adhesively mounted on the top face of the punch blank 31 in closely spaced relation with the positions at which such blank will be engaged by the die blade 26 and the piercing punches 28, so as to form defined areas at and adjacent those positions. The barrier blocks will form a dam to support the soft resin in those defined areas and cause it to fill the space between themselves and the shearing elements 26 and 28. The use of such blocks improves the completeness and accuracy with which the resin conforms to the shearing element surfaces.

The thus-prepared punch blank is then mounted on an assembly jig 40 as shown in FIGS. 3 and 5. Such jig comprises a base plate 42 on which are accurately mounted two perpendicular posts 44 which precisely correspond in size and relative location with the dowel pins 11 and 15 of the master die set 10–14 on which the dies 20 and 30 are to be used.

For purposes of producing desired clearance between the shearing elements 26 and 28 of the upper die 20 and the punch die to be made from the punch blank 31, one or more layers of tape 37 of known thickness are applied to the inner or shear face of the steel rule blade 26, desirably over its entire exposed height projecting from the die block 21, as shown in FIG. 5. To produce corresponding clearance between the piercing punchs 28 and the punch die, one or more layers of tape 37 are also applied to the side surface of each piercing punch 28 over its entire projecting length, again as shown in FIG. 5. It has been found convenient to have in hand a supply of pressure-sensitive cellophane or like plastic tape in varying thicknesses ranging from 0.001 inch to 0.006 inch in thickness, and to use these singly and in combination to build up clearance-producing layers of tape 37 on the shear elements as desired.

The defined areas between the positions of the barrier blocks 34 and the edges of the punch blank 31 are then coated with a thick impressionable layer 38 of a raw resin such as epoxy resin. The resin is applied in uncured state and is desirably allowed to partially cure to a soft impressionable state. The resin layer is desirably at least about ⅛ inch thick, and may be thicker up to say about ¼ inch.

The punch blank 31, mounted on the plate 33 and bearing the soft impressionable resin layer 38, is assembled on the jig 40 with the base plate 33 resting on the base 42 and located by engagement of the dowel posts 44 in the dowel holes 32. The shearing elements of the top die 20, namely the blade 26 and the piercing punches 28, bearing the clearance-producing layer of tape 37 on their shear faces, are coated with wax or other parting compound to prevent adhesion by the resin, and the complete die 20 is then assembled on the jig 40, by engaging the dowel holes 22 over the dowel posts 44 with the working edges 29 of the steel rule projecting downward. The die 20 is then lowered on the dowel posts 44 to bring the working edges of its shearing elements 26 and 28 into engagement with the soft resin layer 38, and the die 20 is pressed downward to cause such elements to impress themselves in the soft resin material, as shown in FIG. 5. Manual pressure may be used, but we have found it advantageous to use an air-actuated press.

The assembly is then allowed to stand at room temperature with the die 20 impressed into the soft resin until the resin is completely cured to a hard state. This produces in the resin layer a fixed impression of the shearing elements of the upper die 20, with clearance provided by reason of the tape 37 on such elements in an amount determined by the thickness of the tape layer. Such impression is defined by wide edge faces 48 on the resin layer 38. The dies 20 and 30 are then disassembled from the jig, and the punch blank 31 bearing the impression of the shearing elements 26 and 28 of the die 20 in its resin layer 38 is removed from the base plate 33.

The next two steps in the method, illustrated in FIGS. 8 and 9, may be done in any order. As shown in FIG. 8, the marginal portions 31a of the punch blank 31 are cut away, as by sawing along a saw kerf S close to but spaced from the impression-defining edge faces 48 of the plastic layer 38. The resulting exposed faces 48 are then coated with a coloring material or dye, either with a brush or with a spray device 46 as shown in FIG. 9. The coating 49 is desirably of a color which contrasts with the color of the resin in the layer 38, for example if such plastic is gray or white in color, the coating 49 is conveniently red. A convenient coating material is a layout fluid or ink commonly used to coat metal surfaces for purposes of emphasizing layout lines on such surfaces. Such material is commercially available under the trade name Dykema. The coloring desirably forms a thin coating on the edge surface 48 of the plastic, and may to some extent penetrate a short distance into such surface as indicated in FIG. 9.

As the next step, the rough projecting edge portion of the punch blank 31 is machined away, to the edge surface 48 defining the die impression in the plastic 38. This may be done in any convenient way, but in the final stages at least, is conveniently done with a power driven file 50 which reciprocates in a plane perpendicular to a supporting table 52 as shown in FIG. 10. This finish machining operation is controlled by observing the face 48 and is continued until the machining tool engages the surface 48 and begins to remove color therefrom. Where red Dykema layout liquid is used as the colorant, it has been found desirable to continue the finish machining until the red surface coating on the surface 44 is at least partially removed and the color of the surface changes from red to pink.

Such finish machining is carried out about the whole periphery of the die blank 31 so as to bring its peripheral surface into conformity with the impression made in the plastic layer 38 by the tape-covered shear faces of the steel rule die blade 26. In a similar manner, the punch blank 31 is drilled and machined to the edge face 48 formed by the impression of the tape-covered piercing punch 28, so as to form an opening therein for that piercing punch 28. In each case, the finished shear face produced on the die blank 31 will be coplanar with the edge surface 48 of the plastic layer 38 produced by the clearance-defining layer of tape 37 on the shear faces of the upper die 20, so that such shear faces on the punch blank 31 will have clearance from the shear faces of the upper die 20, with that clearance equal to the thickness of the layer of tape 37. Use of the tape thus accurately produces a clearance which is predetermined by the thickness of the layer of tape 37 used in preparing the upper or first die 20 for making the impression in the resin layer 38 to which the punch blank 31 is machined.

To prepare the finished punch blank 31 for use as a die punch 39, the barrier blocks 34 and the residue of the resin layer 38 are removed from the surface of the punch blank 31, and the finished punch 39 is remounted on the die plate 33. This assembly forms a punch die 30 which is then mounted on the lower shoe 14 of a die set as shown in FIG. 4. The tape 37 is removed from the shearing elements of the upper die 20 which was used to form the impression on the punch blank 31, and such die is then mounted on the upper shoe 10 of the die set. The two dies are located by the dowels 11 and 15 which taken into the holes 22 and 32 in the two die blocks, so that the two dies have the same aligned relation as existed in their relation on the jig 40 and as shown in FIG. 5.

The application of the method of this invention to a larger die is illustrated in FIGS. 6 and 7. FIG. 6 shows a large punch blank 131 adapted to be used for cutting a door panel from sheet stock. On the finished punch die, the edges of the panel will be cut at the positions indicated by the dotted lines 133, a window opening will be cut at the position indicated by the dotted lines 135, and a door handle opening will be punched at the position of the dotted circle 137. Barrier blocks 140, as of foamed plastic, are adhesively mounted on the face of the punch blank 131 in positions closely spaced inward from the cut line 133 for the edge of the panel, additional blocks 142 are adhesively mounted on the face of the punch blank 131 about the cut line 135 for the window opening and a filler block 143 is mounted in the center of the window opening, and a ring 144 of barrier material is mounted on the face of the die blank 131 about the position of the cut line 137 for the door handle. When the barrier elements are all in place, the areas defined by the blocks 142–144 and containing the cut lines 133, 135, and 137 are then overlaid with an impressionable layer 138 of a raw resin such as epoxy resin.

The resulting punch blank is mounted in a suitable jig or die set, and a companion die 120 held in alignment therewith by the jig or die set is brought down against the top face of the punch blank in the same manner as before and as illustrated in FIG. 7. As there shown, the upper die 120 comprises a die block 121 having a steel rule die blade 126 therein to cut along the line 133 in FIG. 6, and containing a piercing punch 128 for piercing the door handle opening defined by the line 137 in FIG. 6. As before, the shear faces of the cutting elements 126 and 128 are covered with a clearance-producing layer of tape 37 in a predetermined thickness suitable to produce a desired clearance in this set of dies. The projecting ends of the cutting elements 126 and 128 are pressed into the impressionable layer 138 of soft plastic, and the plastic is allowed to harden with those elements so pressed into the plastic and against the punch blank 131. As before, this produces an exact impression of the cutting elements of the upper die, with clearance provided by the layer of tape 37, with that impression fixed in the hardened plastic and defined by wide edge faces 48 thereon. The die blank carrying this fixed impression of the upper die is then removed and is finished in the sequence of steps illustrated in FIGS. 8–10. Thus, the blank is cut as along a saw kerf S close to the impression designing faces 48 as indicated in FIG. 8, such faces are then coated with a coloring liquid as indicated in FIG. 9, and the die blank is then finish machined to the colored impression faces 48 as with a file or other machining tool as indicated in FIG. 10. The die punch thus prepared from the punch blank 131 is mounted on a suitable die plate and provides a punch die for use with the companion die 120 and which is accurately formed to match that die 120 and to have clearance therefrom in an amount determined by the thickness of the layer of tape 37 used.

We claim:

1. The method of making steel rule dies, comprising forming a steel rule first die having shearing elements with shearing side faces thereon and having means for positioning the die in a holder, mounting a punch die blank on a support having means for positioning the punch die in aligned relation with the first die, applying to the shearing side faces of the shearing elements one or more layers of adhesive tape of predetermined thickness to define a clearance-producing layer thereon, providing an adherent impressionable soft layer of hardenable resin on the punch blank over areas opposite the shearing elements of said first die, said layer being of substantial thickness so as to form a die element impression defined by edge faces of substantial width, assembling the first die in aligned relation with the punch die blank and with the shearing elements of the first die impressed deeply in said soft impressionable resin layer so as to form wide edge faces in said layer matching the faces of said clearance-producing layer of tape on the shearing faces of the first die, hardening said resin layer with the parts so assembled so as to form a hardened impression defined by said wide edge faces, and machining the punch blank to said hardened impression to form a punch to match said first die with clearance therefrom corresponding to the thickness of said tape.

2. The method of claim 1 with the addition of applying to the wide edge faces of said hardened impression a thin coating of contrasting color prior to the machining step, and controlling the punch blank machining step in accordance with removal of color from such edge faces.

3. The method of claim 1 with the addition of adhering barrier elements to the face of the punch blank so as to form defined areas thereon opposite the shearing elements of the first die, and applying said adherent impressionable soft layer of hardenable resin to said defined areas and not to other areas of the punch blank.

4. The method of claim 1 with the addition that said barrier elements form a dam close to the position of the shearing side faces of the first die for confining the soft resin into close conformity with such side faces.

5. The method of making steel rule dies, comprising forming a steel rule first die having shearing elements with shearing side faces thereon and having means for positioning the die in a holder, mounting a punch die blank on a support having means for positioning the punch die in aligned relation with the first die, providing an adherent impressionable soft layer of hardenable resin on the punch blank over areas opposite the shearing elements of said first die, said layer being of substantial thickness so as to form a die element impression defined by edge faces of substantial width, assembling the first die in aligned relation with the punch die blank and with the shearing elements of the first die impressed deeply in said soft impressionable resin layer so as to form an impression of such shearing elements defined by wide edge faces in said layer, hardening said resin layer with the parts so assembled so as to form a hardened impression defined by said wide edge faces, applying to the wide edge faces of said hardened impression a coating of contrasting color, machining the punch blank to said hardened impression and controlling such machining in accordance with removal of color from such edge faces, to form a punch to match said first die.

6. The method of making a punch die to match a first die having shearing elements with shearing side faces thereon, in which a punch blank is coated with a soft impressionable thick layer of hardenable resin over areas thereof opposite the shearing elements of the first die and such shearing elements are impressed in the resin layer and the layer then hardened to produce a fixed impression of the shearing elements defined by wide edge faces of the hardened resin, and the punch blank is machined to such edge faces to produce a punch matching the shearing elements of the first die, which includes the improvement comprising the step of applying to the shearing side faces of said shearing elements a clearance-producing layer of tape or the like, before impressing said shearing elements in the resin layer, so that the edge faces of the impression will provide for clearance between the first die and the punch produced by machining the punch blank to such edge faces.

7. The method of making a punch die to match a first die having shearing elements with shearing side faces thereon, in which a punch blank is coated with a soft impressionable thick layer of hardenable resin over areas thereof opposite the shearing elements of the first die and such shearing elements are impressed in the resin layer and the layer then hardened to produce a fixed impression of the shearing elements defined by wide edge faces of the hardened resin, and the punch blank is machined to such edge faces to produce a punch matching the shearing elements of the first die, which includes the improvement comprising the step of applying contrasting coloring material to the wide edge faces of the hardened resin before machining the punch blank to such edges, and controlling the machining in accordance with removal of contrasting color from such edges by the machining.

8. The method of making a punch die to match a first die having shearing elements with shearing side faces thereon, in which a punch blank is coated with a soft impressionable thick layer of hardenable resin over areas thereof opposite the shearing elements of the first die and such shearing elements are impressed in the resin layer and the layer then hardened to produce a fixed impression of the shearing elements defined by wide edge faces of the hardened resin, and the punch blank is machined to such edge faces to produce a punch matching the shearing elements of the first die, which includes the improvement comprising the step of affixing barrier elements to the punch blank to form defined areas thereon at and adjacent the positions of shearing elements on the first die, and applying the resin layer to such defined areas, the barrier elements serving to confine the resin into close conformity with the shearing faces of the shearing elements impressed therein.

9. The method according to claim 6 or 8 which includes the step of applying contrasting coloring material to the wide edge faces of the hardened resin before machining the punch blank to such edges, and controlling the machining in accordance with removal of contrasting color from such edges by the machining.

* * * * *

UNITED STATES PATENT AND TRADEMARK OFFICE
CERTIFICATE OF CORRECTION

PATENT NO. : 4,226,143

DATED : October 7, 1980

INVENTOR(S) : Graydon D. Whitecottom and Wally E. Whitecotton

It is certified that error appears in the above-identified patent and that said Letters Patent are hereby corrected as shown below:

In the Heading, delete "Walley" and insert therefor --Wally--.

Col. 3, line 35, delete "lug" and insert therefor --slug--.

Signed and Sealed this

Third Day of February 1981

[SEAL]

Attest:

Attesting Officer

RENE D. TEGTMEYER

Acting Commissioner of Patents and Trademarks